(12) United States Patent
McHenry et al.

(10) Patent No.: US 8,325,642 B1
(45) Date of Patent: Dec. 4, 2012

(54) REDIRECTION OF MESSAGE FROM MOBILE STATION BASED ON IDENTITY OF MOBILE STATION

(75) Inventors: James F. McHenry, Pt. Pleasant, PA (US); Song Ki Hong, San Francisco, CA (US)

(73) Assignee: Cellco Partnership, Basking Ridge, NJ (US)

( * ) Notice: Subject to any disclaimer, the term of this patent is extended or adjusted under 35 U.S.C. 154(b) by 787 days.

(21) Appl. No.: 12/466,056

(22) Filed: May 14, 2009

(51) Int. Cl.
*H04B 7/00* (2006.01)
(52) U.S. Cl. ........ 370/312; 370/310; 370/328; 370/343; 370/349; 370/465
(58) Field of Classification Search .................. None
See application file for complete search history.

(56) References Cited

U.S. PATENT DOCUMENTS

| | | | |
|---|---|---|---|
| 7,319,880 B2 | 1/2008 | Sin | |
| 2004/0198322 A1* | 10/2004 | Mercer | 455/412.1 |
| 2007/0275738 A1* | 11/2007 | Hewes et al. | 455/466 |
| 2008/0065752 A1* | 3/2008 | Ch'ng et al. | 709/223 |
| 2008/0119210 A1* | 5/2008 | Snyder et al. | 455/466 |

* cited by examiner

*Primary Examiner* — Hassan Phillips
*Assistant Examiner* — Gautam Sharma

(57) ABSTRACT

An application service utilizes a single short code for messaging service through a mobile network, even though the one service is actually supported by multiple servers or the like, typically operated by different service providers. In the examples, a third party application service type platform is associated with the common short code of the application service. The third party platform performs intelligent routing/address changes to re-direct mobile station originated messages among the equipment of the service providers. The platform may also provide short code translations of source addresses, during processing of messages directed to mobile stations from the various application servers.

17 Claims, 4 Drawing Sheets

REDIRECTION OF MESSAGE FROM MOBILE STATION BASED ON IDENTITY OF MOBILE STATION

TECHNICAL FIELD

The present subject matter relates to techniques and equipment to redirect mobile originated mobile messaging service messages communicated to/from application service provider equipment, based on mobile station identity, for example, to allow such messages that may use the same short code that identifies a particular application service to be selectively routed among multiple service providers effectively sharing the same short code for one application service.

BACKGROUND

In recent years, mobile wireless communications have become increasingly popular. Initial implementations of mobile wireless communications, for example in the form of cellular telephone networks, supported circuit switched voice communication services. Mobile voice telephone communication is now ubiquitous in many countries, and mobile services are replacing fixed landline service even for traditional voice telephone calls. However, for many years now the mobile service offerings have extended far beyond the traditional voice telephone call model.

For example, the mobile carriers developed short messaging service (SMS) technology to provide text and/or email communications via the wireless communication networks. As the public wireless communication networks have evolved to provide greater bandwidth and packet based services, the industry has developed a variety of data services, such as web browsing, as well as a variety of services using multimedia messaging service (MMS) technology. Many of the messaging services such as SMS and MMS support message traffic between mobile stations, e.g. for message exchange between users. However, these popular messaging services also support traffic between mobile stations and server equipment from which service providers offer users a variety of different types of application services.

In a public wireless mobile communication network that offers one or more of the SMS or MMS type messaging services, each wireless subscriber device typically is assigned a valid telephone number, often referred to as a Mobile Directory Number or MDN. The MDN, for example, is used as a destination address to terminate call routing for call delivery and/or for message delivery. The MDN may also be used to identify the subscriber and verify subscription profile information during communications through the network.

A mobile messaging service type message, such an SMS message, includes source and destination address fields. For messages from a user device, the source address is the mobile directory number (MDN) of the sending user's mobile station. The destination address may be a MDN of a destination station or some other form of recognizable address. Of note for purposes of this discussion, when the message relates to a particular application service, the destination address is an address of the server equipment hosting the application, typically, in the form of a short code assigned to the particular application.

If the message originates at such an application server, the destination address would be a MDN of an intended mobile station destination, and the source address would be the short code assigned to the application service or the service provider. For a message addressed to a mobile station, the network routes the message based on the MDN of the intended destination as the routing address, that is to say all the way through to the addressed mobile station. For a message addressed to a service provider, the mobile station initially inserts the short code in the message as the destination address. However, the network translates the source short code in the message into an actual destination address, such as an Internet Protocol (IP) address of the appropriate server, replaces the short code with the translated address, and routes the message to the server based on the translated address.

With these address and routing techniques, one source address (MDN or short code) is used to route each message to one corresponding destination. However, there are situations where it may be desirable to vary the routing or redirect a message to an alternate destination, including variations with regard to multiple destinations and/or sources on the application service side. Past proposals for redirection or forwarding have addressed SMS messages addressed to the mobile stations. For example, U.S. Pat. No. 7,319,880 describes one method for forwarding SMS messages addressed to the mobile stations, although the alternate destination may be another "on network" mobile terminal or may be "off network" such as a mobile terminal on another network or a phone or other device at a public switched telephone network (PSTN) destination. This type of approach does not really address situations relating to multiple application service providers, e.g. providing the same service but using separate equipment. Also, it appears the network's message centers are the key elements for resolving the location of the forwarding destination. As the number of messaging service messages carried by mobile communications networks continues to increase, the burden placed on the messaging service centers also increases. Resolving the message forwarding destination at the message center may decrease the center's ability to provide other services, e.g. related to its basic message storage and delivery functions.

However, there are situations when the forwarding or redirection of messages may actually relate to messages from mobile devices directed toward the application service provider(s), and scenarios that give rise to a need for redirection of messages addressed to such service providers may also create issues regarding messages coming from the multiple service providers. To understand these types of concerns, it may be helpful to consider a specific application service that has encountered these kinds of message addressing and routing problems.

In recent years, automotive companies and their partners have developed increasingly sophisticated telematics systems to detect an emergency condition or activation, and in response, initiate a call to a call center for assistance. Similar systems have also been developed for monitoring fixed customer premises locations or personnel at a specific site. For motor vehicle applications, for example, an on-board system monitors one or more sensors to determine when a crash or other emergency has occurred. Upon detecting an emergency condition, such as a crash, the on-board system activates a cellular transceiver to initiate a cellular communications with a call center of the telematics service provider (TSP). Although a voice call typically is provided, the communications include a data communication of information such as location determined by global positioning satellite (GPS) processing, identification data and crash related data. The voice call may follow the data transmission, essentially using the same communication resources through the network. However, some implementations use existing mobile network messaging services, such as SMS, to provide the requisite data communications for the telematics service.

In the emergency report type telematics service outlined above, the mobile device of the telematics unit in the vehicle sends one or more messages, typically using SMS, using a short code assigned to the telematics service. The mobile network routes each such message to a telematics service provider, typically to a data server associated with the provider's call center, in the same manner as any other upstream message transmission to an application service provider. In addition to the emergency reporting services, the call center service providers have started offering services that involve downstream data transmissions to the mobile device in the vehicle, such as turn-by-turn directions. The server of the provider sends each message addressed to the mobile device, typically using the MDN of the mobile device as the destination address and the short code of the provider/application as the source address, as in other application services that utilize SMS and/or MMS type delivery services. A situation has arisen, however, in which services corresponding to one short code are actually supported by two different service providers and their associated server and call center equipment.

An auto company Auto-CO offers telematics service to end-user owners of their vehicles. The Auto-CO initially utilizes a company CO-A to provide the call center service but wants to change to a second vendor we will call company CO-B. Due to contractual obligations to service provider CO-A, for a time, at least some of the existing customers will stay with company CO-A but new customers' service will go to company CO-B. This presents a problem because all of the devices currently send all of the messages from the vehicles to CO-A, using a single address, e.g. a single short code assigned to the server(s) of company CO-A. When company CO-B comes on line, the SMS messages from some devices need to be routed to the server or servers for CO-B, but some still need to go to equipment of service provider CO-A, even though the messages will all be addressed to the same location or short code.

In this scenario, at least during some transitional period, both telematics service provider platforms will be supporting service to/from the devices in Auto-CO's vehicles. However, hardware constraints prevent the configuring of new short codes on the telematics devices in the vehicles. Hence, there is a need for an intelligent routing solution that can route messages to equipment of either of the telematics entities based on some criteria, such as the identity of the vehicle/ device. It is believed that a similar need exists or the intelligent solution may provide advantages in the context of other types of application services that utilize mobile messaging service type message transport via a wireless/mobile communication network.

SUMMARY

The teachings herein alleviate one or more of the above noted problems with message routing and provide effective redirection with attendant short code translations, in the context of an application service that utilizes mobile messaging service type message transport via a wireless mobile communication network.

Although other implementations are contemplated, the examples utilize a third party application service type of platform with the common short code of the application service assigned to that platform. The third party platform performs the intelligent routing and re-directs all incoming messages, for example, by substitution of appropriate short codes selected based on identification the mobile devices. The third party platform, in such an exemplary implementation, effectively provides a point of mediation among the actual application service providers, as a result of message communications/exchange between the service providers and the third party platform.

An example of the concepts disclosed and discussed in more detail below might include a method of processing mobile messaging service messages relating to one application service for mobile devices, where the one application service is available from servers of a number of application service providers. Such a method might involve receiving mobile messaging service messages from mobile devices via a wireless mobile communication network. For example, a first message received from a first mobile device is routed through a wireless mobile communication network based on a messaging service short code of the one application service, which at least initially was contained in the first message as a destination address. In a similar fashion, another message is received from a second mobile device, having been routed through the wireless mobile communication network based on the same messaging service short code of the one application service at least initially contained in the as a destination address. However, Processing of the two received messages is somewhat different.

Based on identification of the first mobile device, an address for a server of a first provider of the one application service is obtained and used to replace the destination address in the first message as a new destination address for the first message. The first message is then transmitted or forwarded, for routing based on the address for the server of the first provider as the new destination address, typically to enable delivery thereof to the server of that service provider. In contrast, based on identification of the second mobile device, an address for a server of a second provider of the one application service is obtained, which is different from the address for the server of the first provider and used to replace the destination address in the second message as a new destination address for the second message. The second message is then transmitted or forwarded, for routing based on the address for the server of the second provider as the destination address, typically to enable delivery thereof to the server of that service provider. In this way, the messages from two different mobile devices served by different providers of the one application service, can be routed to the equipment of the different service providers, even though the messages from the different mobile devices initially use the same short code as the initial destination address.

The present concepts are applicable to applications services using a variety of different types of messaging services offered by wireless mobile communication networks, such as enhanced messaging service (EMS) messages and multi-media messaging service (MMS) messages. Specific examples discussed in detail below, however, use short messaging service (SMS) type transport for the messages. Also, although the concepts may apply to other applications services that use such messaging services, for convenience, we will mainly focus on use in a telematics service application offered to owners of motor vehicles.

Mobile devices may be identified by various information associated with the devices and/or with the users of the devices. The examples, particularly those using SMS message communications, identify mobile devices based on their assigned mobile directory numbers.

The server addresses could use any appropriate network addressing scheme. In the examples, the addresses for the servers of the two application service providers are respectively assigned short codes. In such a case, the short codes of the providers are different, and those codes are different from the short code assigned to the particular application service.

As noted, some application services, including some telematics services, may involve messaging service communications from the service provider equipment to the mobile devices. The service provider equipment typically includes a source address in each such downstream message transmission. It may not be necessary to translate different source destination address, either because they are not critical or because the different servers of the service providers may be able to insert any desired source address in each such message (e.g. all might insert the one short code of the application service). However, at least in some cases, it may also be desirable to provide address translations on messages sent from the service provider equipment to the mobile devices.

For this later situation, the methodology discussed herein may offer additional processing. Such a methodology might further involve receiving a third mobile messaging service message from the server of the first provider addressed to the first mobile device. This message contains the address for the server of the first provider as the source address of the third mobile messaging service message. That source address is replaced with the messaging service short code of the one application service, and the third message with that short code source address is sent through the wireless mobile communication network for delivery to the first mobile device. Another (fourth) mobile messaging service message is received from the server of the second provider addressed to the second mobile device, but this message contains the address for the server of the second provider as the source address of the fourth mobile messaging service message. For the fourth message, the different source address is replaced with the short code of the one application service, and the third message with that short code source address is sent through the wireless mobile communication network for delivery to the second mobile device. In this way messages addressed to different mobile devices from different servers supporting one common application service arrive at the various mobile devices containing the one short code of the particular application service.

It might be possible to implement various intelligent routing and/or address processing functions in support of the message direction/distribution among the various service providers, as outlined above, at the messaging service centers which store and forward the messages within the wireless mobile communication network. Another approach might be to redirect messages based on intelligent processing in a switch or control node of the network, in a manner analogous to forwarding or redirection of voice calls. However, such solutions require an upgrade of the processing of the message service center or the switch or other control node, which may require a long time and a large expense to deploy across a large wireless mobile communication network. Also, such approaches tend to add processing burdens to existing elements having other possibly more critical functions.

Hence, the examples described below implement the address translations and the like in a third party application service provider type of server, which is coupled for communication of messaging service messages via the wireless mobile communication network. The third party application service provider server is separate from the servers of the providers that actually offer the application service.

Other concepts discussed herein relate to a server and/or software for implementing the message processing strategies. A software product or article, in accord with this type of concept, includes at least one machine-readable medium and information carried by the medium. The information carried by the medium may be executable program code (programming instructions), one or more databases and/or other information regarding the handling of the message service messages from and possibly going to the mobile devices, for the one application service. A server would include an appropriate communication interface, a central processing unit and a memory storing the appropriate program to enable the hardware of the server to implement the message processing strategy.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples discussed below relate to message routing and providing effective redirection with attendant processing of short code type addresses, in the context of an application service that utilizes mobile messaging service type transport via a wireless mobile communication network. The application service utilizes a single short code even though the one service is actually supported by multiple servers or the like, typically operated by different service providers. The examples utilize a third party application service type of platform with the common short code of the application service assigned to that platform. The third party platform performs intelligent routing (e.g. by replacing destination addresses with other short codes or other destination server addresses) to re-direct all messages from mobile stations to the servers, for example, based on identification the originating mobile devices. The third party platform, in such an exemplary implementation, effectively provides a point of mediation among equipment of the actual application service providers, via the message communications/exchange between the service provider equipment and the third party platform. The platform may also provide short code translations of source addresses, during processing of messages directed to mobile stations from the various application servers. To fully appreciate such operations, it may be helpful to discuss an example of a system, including various networks, that supports the relevant communications and associated short code related processing of the messaging traffic for an exemplary application service.

Figure 1:
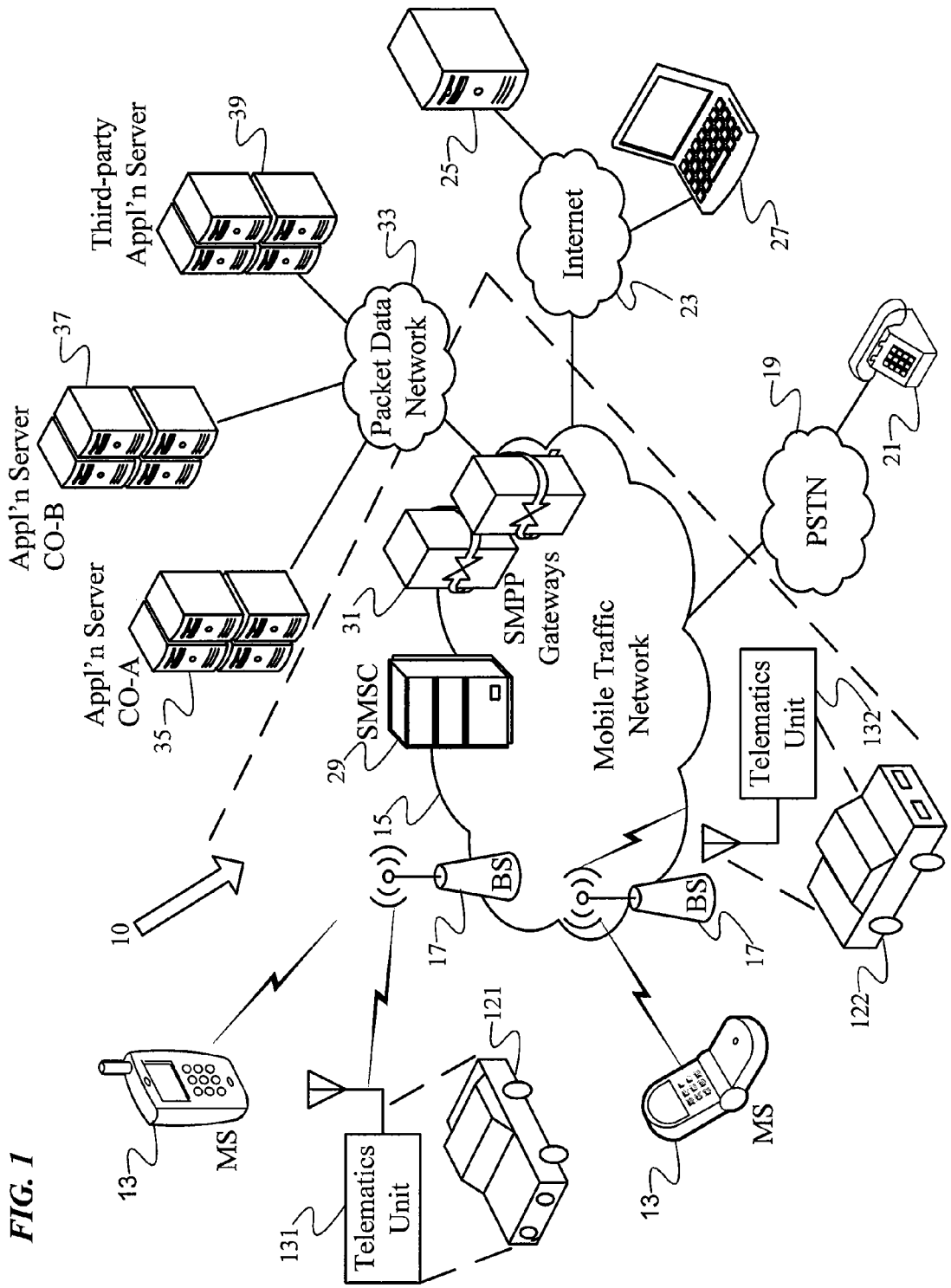
FIG. 1 is a high level functional block diagram, useful in explaining mobile stations, network elements and other components that may be involved in mobile station communications as well as a telematics service that utilizes mobile network resources.

FIG. 1 is a functional block diagram of an exemplary system of networks for providing mobile voice telephone services and various data services. In this system, the network 10 is a wireless mobile communication network.

The network 10 often (but not always) comprises networks operated by a number of different mobile communication service providers, carriers or operators, although for simplicity of discussion 10 is assumed to be a network operated by one carrier. The communication network 10 provides mobile voice telephone communications as well as other services such as text messaging and various multimedia packet data services, for numerous mobile devices. One type of mobile device shown in the drawing is users' mobile stations 13. The present discussion is applicable to a variety of application services, using mobile network messaging services as the transport mechanism, where application servers/service providers offer the same service as identified by a common short code. However, for purposes of discussion, the drawings show an example in which the common application service relates to a telematics service. Hence, the drawing shows a first vehicle 121 having an associated telematics unit 131 configured for crash detection and related emergency communication functions. The drawing also shows a second vehicle 122 having an associated telematics unit 132 configured for crash detection and related emergency communication functions. The telematics units 131, 132 are another type of mobile device that communicates via the wireless mobile communication network 10. The elements indicated by the reference numeral 10 generally are elements of the carrier's network, although the mobile stations 13 typically are sold to the carrier's customers. Similarly, the vehicles and telematics units are sold to customers. To the network 10, the telematics units 131, 132 are essentially treated as mobile station devices.

Today, mobile stations such as shown at 13 typically take the form portable handsets, smart-phones or personal digital assistants, data cards for computers, although they may be implemented in other form factors. The mobile communication network 10 provides communications between mobile stations 13 as well as communications for the mobile stations with other networks and stations shown generally at 11 outside the mobile communication networks.

Hence, the network 10 allows users of the mobile stations 13 that are currently operating through the network to initiate and receive telephone calls with each other as well as through the public switched telephone network (PSTN) 19 with telephone stations 21 connected thereto. The network 10 typically offers a variety of text and other data services, including services via the Internet 23, such as downloads, web browsing, e-mail, etc. via servers shown generally at 25 as well as message communications with terminal devices represented generally by the personal computer (PC) 27. A number of the data services provide messaging services. Examples of such services include SMS, EMS and MMS. Although the present teachings may be applied to any of these or other types of messaging services, for purposes of a specific example to discuss here, we will assume that the network 10 allows SMS type text messaging between mobile stations 13 and similar messaging with other devices, e.g. via the Internet 23.

Although other elements are included for vehicle monitoring, crash detection and user interface, the communication elements and location elements of each telematics unit 131, 132 are generally similar to corresponding elements of a regular mobile station 13. To the wireless mobile communication network 10, each telematics unit 131, 132 is provisioned and operates in a manner generally similar to a mobile station (MS) 13, although the network services available to the telematics units may be somewhat limited in comparison to those available to various mobile stations 13. For example, the telematics units 131, 132 may be provisioned only to send/receive voice and SMS type messaging communications to/from call center(s) of the telematics service provider(s).

The network 10 may implement wireless communications with the mobile stations 13 (and similar mobile telematics units 131, 132) via any of a variety of different standard communication technologies common in public wireless mobile communication networks. Examples of such technologies include various CDMA standards, including 3GPP2 variants thereof (e.g. 1XRTT or EVDO), as well as TDMA and GSM standards including 3GPP variants (e.g. LTE or UMTS). The mobile stations 13 and the communications elements of the telematics units 131, 132 would be configured to communicate in accord with the wireless standard supported by the network 10, although many such mobile devices have the capability of communicating via a number of networks that may utilize different standardized technologies (multi-mode devices).

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as SMS messaging centers (SMSCs) 29 and/or multimedia messaging centers (MMSCs—not shown). A regional portion of the network 10, such as that serving mobile stations 13 and the telematics units 131, 132, will typically include one or more RANs and a regional circuit and/or packet switched network and associated signaling network facilities.

Physical elements of a RAN operated by one of the mobile service providers or carriers, include a number of base stations represented in the example by the base stations 17. Although not separately shown, such a base station (BS) 17 typically comprises a base transceiver system (BTS) which communicates via an antenna system at the site of the base station and over the airlink with one or more of the mobile devices 13, 131, 132, when the mobile devices are within range. Each base station (BS) 17 typically includes a BTS coupled to several antennas mounted on a radio tower within a coverage area often referred to as a "cell." The BTS is the part of the radio network that sends and receives RF signals to/from the mobile devices that the base station currently serves.

The radio access networks also include or connect to a traffic network represented generally by the cloud shown at 15, which carries the user communications for the mobile stations 13 and the telematics units 131, 132 between the base stations 17 and other elements with or through which the various wireless mobile devices communicate. Individual elements such as switches and/or routers forming the traffic network 15 are omitted here for simplicity.

A Mobile Directory Number (MDN) is the telephone number assigned to a mobile station, which a calling party or device inputs in order to call or send a message to the particular mobile station. To call a mobile station 13, for example, a user of a PSTN telephone or of another mobile station dials the MDN associated with the particular mobile station 13. To send a MMS message or a SMS message to destination mobile station 13, as another example, typically entails input of the MDN of that mobile station. A Mobile Identification Number (MIN) is an identification number used by the network 10 to signal a particular mobile station. The MIN is formatted like a telephone number, and the MIN may be the same as the MDN. However, increasingly, the network 10 assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations. To facilitate communications through the network 10, the telematics units 131, 132 also are assigned MDN and MIN numbers, in essentially the same manner as are the mobile stations 13.

The traffic network portion 15 of the mobile communication network 10 connects to the public switched telephone network (PSTN) 19. This allows the network 10 to provide voice grade call connections between mobile stations and regular telephones connected to the PSTN 19. The drawing shows one such telephone at 21. This interconnection supports regular voice telephone traffic of the mobile stations 13 as well as voice communications for the telematics units 131, 132, for example, with telephone equipment (not shown) at one or more call centers of the companies providing the telematics type application service.

The traffic network portion 15 of the mobile communication network 10 connects to a public packet switched data communication network, such as the network commonly referred to as the "Internet" shown at 23. As noted earlier, packet switched communications via the traffic network 15 and the Internet 23 may support a variety of user services through the network 10, such as mobile station communications of text and multimedia messages, e-mail, web surfing or browsing, programming and media downloading, etc. For example, the mobile stations 13 may be able to receive messages from and send messages to user terminal devices, such as personal computers, either directly (peer-to-peer) or via various servers. The drawing shows one such user terminal device as a personal computer (PC) at 27 and one sever 25, by way of example.

For purposes of the discussion of handling of messaging traffic, by manipulations based on short codes, we will concentrate on an SMS type implementation of the messaging service that carries or transports the data portion of the application service communications through the network 10. Those skilled in the art will recognize, however, that the telematics application service or other types of application services may utilize other types of the messaging services available in the typical wireless mobile communication network 10, and that the present concepts are equally applicable to application services using those other types of messaging services through the network.

Wireless carriers developed the short message service (SMS) to transmit text messages for display on the mobile stations. In many existing network architectures, the SMS traffic uses the signaling portion of the network 15 to carry message traffic between a Short Message Service Center (SMSC) 29 and the mobile stations 13. The SMSC 29 supports mobile station to mobile station delivery of text messages. However, the SMSC 29 also supports communication of messages between the mobile stations and devices coupled to other networks. For example, the SMSC 29 may receive incoming IP message packets from the Internet 23 for delivery via the network 15, one of the base stations 17 and a signaling channel over the air link to a destination mobile station 13. For this later type of SMS related communications, the network 10 also includes one or more Short Message Peer-to-Peer (SMPP) protocol gateways 31. The SMPP gateway 31 provides protocol conversions, between SMPP as used by the SMSC 29 and the protocols used on the Internet 23 or other IP network 33. SMPP messages ride on IP transport, e.g. between the gateway 31 and the SMSC 29.

The exemplary system also includes one or more other packet communication networks 33 connected to the mobile network 10. The network 33 may be a private packet data network operated by the same carrier that operates network 10 for its own purposes, or the network 33 may be a secure network interconnected among several parties working together to provide certain secure services. Alternatively, the network 33 may be the Internet 23. Of note for purposes of the present discussion, the network 33 provides packet data communications between the gateway (GW) 31 to the traffic network 15, for a number of application servers.

As noted earlier, in the discussion regarding the various mobile devices, the present discussion is applicable to a variety of application services, using mobile network messaging services as the transport mechanism, where application servers/service providers offer the same service as identified by a common short code. However, for purposes of discussion, the drawings show an example in which the common application service relates to a telematics service offered to owners of vehicles 121, 122. Hence, the servers 35 and 37 are application servers operated by entities that provide the telematics service.

The owners of the vehicles 121 and 122 subscribe to the telematics service offered by the vehicle manufacturer, called Auto-CO in our example. For various reasons, however, the actual service is provided by two different service provider companies, CO-A and CO-B, typically under contract with Auto-CO. Service for the first vehicle 121 is allocated to CO-A, whereas service for the second vehicle 122 has been allocated to CO-B. Each service provider will operate a call center, which supports certain data communications as well as voice communications with the provider's call attendant personnel. In a typical operation, a telematics unit will detect a vehicle condition indicating a crash or other emergency condition of the vehicle or will detect actuation of an "emergency" or "panic" button associated with the telematics unit by an occupant of the vehicle. In response, the telematics unit initiates a communications through the mobile wireless communication network 10 with the appropriate provider's call center. Certain data regarding the vehicle and the event are communicated to the call center's data equipment, via SMS in the present example. The communication also results in a voice call between the center and the telematics unit in the vehicle. Similar procedures may be used in non-emergency communications of the telematics unit, e.g. for turn-by-turn directions or location based concierge service.

The present discussion of message handling focuses on the message processing, that is to say the processing of the SMS messages in the telematics example. Hence, voice call elements related to the telematics service are omitted here for convenience. As shown in the drawings, each telematics service provider will operate at least one application server. Those skilled in the art will recognize that conventional call forwarding or redirection techniques can be used to distribute the voice calls from the telematics units to voice equipment at each respective service provider's call center.

In our example, the first service provider CO-A operates the telematics application server 35, whereas the second service provider CO-B operates the telematics application server 37. Each of these servers receives messages and provides appropriate communications of the messages to terminals of the provider's personnel at the respective call center (not separately shown). In response to inputs at the terminals, each server 35 or 37 also can send SMS messages back through the network 10 to the mobile devices/telematics units in the vehicles the provider services.

Hence, two of the application servers 35 and 37, in this example, offer the same application service, such as the data component of the exemplary vehicle telematics service for customers of Auto-CO. In the example, the servers may be operated by two different providers of that one service. Of course, there may be additional providers operating other servers. Also, for discussion purposes, we will assume each service provider CO-A, CO-B operates one server, although in an actual implementation either one or both service providers may operate two or more servers and a known mechanism to distribute the traffic and processing load amongst the respective provider's servers.

The application server 39 replaces the address in various messages with short codes of the respective servers, as part of a short code based message exchange between that server 39 and other application servers such as 35 and 37. In the mobile originated (MO) message processing, the server 39 replaces the initial common destination address with the short code of the server of the provider that services the particular sending device. In this way, the server 39 supports the distribution of SMS messaging traffic among the different application servers that provide the one service, that is to say among the application servers 35 and 37 that provide the data component of the telematics service, in this example. In mobile terminated message processing, the server 39 may also translate an address of the sending server 35 or 37 into the one short code for the telematics application service, as a source address for each message sent to a telematics type mobile device.

The server 39 is operated by a 'third party' in that it is operated by a party other than those operating the servers 35 and 37, to provide neutrality in the mediation of traffic amongst the servers 35 and 37. The third party operating the server 39 could be the carrier operating the network 10, in which case, the server 39 could be implemented as an integral part of the network 10, or the third party operating the server 39 could be independent of the network operator/carrier as well.

In the example, we will assume that the third party server 39 provides the short code manipulations and thereby facilitates the message exchange, for the one application service, that is to say for the telematics service of the vehicle manufacturer Auto-CO. Those skilled in the art will recognize that the server 39 or other similar servers may offer similar messaging traffic processing services with respect to other application services.

Examples of mobile messaging service messages typically provided by a wireless mobile communication networks such as network 10 in the illustration today include short messaging service (SMS) messages, enhanced messaging service (EMS) messages and multi-media messaging service (MMS) messages. EMS is an application-level extension to Short Message Service (SMS) for cellular phones available on GSM, TDMA and CDMA networks. MMS adds capabilities for transport of a wider range of content in the messages. For purposes our telematics example, we have assumed that the messages used are SMS type messages, although the present concepts encompasses MMS, EMS and other messaging service communications through the wireless mobile communication network 10. Hence, although other configurations may be used, in this example, the application servers 35, 37 and 39 are ESME servers configured to implement application services that utilize SMS type message transport through the wireless mobile communication network 10.

An SMS message includes source and destination address fields. For messages from a mobile device, the source address is the MDN of the sending customer's mobile station or telematics unit. The destination address may be a MDN of a destination station or some other form of recognizable address. Of note for purposes of this discussion, one type of alternative address is a short code, typically four, five, six, eight, or twelve digits.

A server hosting an ESME application may be assigned a short code. Hence, the network 15 routes outgoing messages from a mobile station 13 or from a telematics unit 131 or 132 using a short code for the destination address of the appropriate ESME application. A short code for SMS is a digit string that is not a telephone number which is typically 7 digits or 10 digits. For example, a short code can be a 4-digit, a 5-digit, a 6-digit, an 8-digit string or a 12-digit string.

The SMSC 29 communicates with external customer equipment, typically computers hosting the ESME applications such as those on servers 35, 37 and 39, via an IP network, in this case the network 33. To provide the interface for such communications, the network 17 includes the SMPP gateway (GW) server 31. The SMPP gateway 31 communicates with the SMSC 29 via an internal IP link or network (not separately shown), and the gateway 31 communicates with the packet data network 33 (and/or the public Internet 23). The gateway 31 allows the SMSC 29 to receive and send messages in IP packet format. The SMPP gateway 31 is the entity within the wireless mobile communication network 10 that acts as an intermediary between the wireless service provider network 10 and the external application server community. For example, the gateway server 31 converts messages in protocol (s) used by the ESME applications one the servers 35, 37 and 39, e.g. Extensible Markup Language (XML), Hypertext Mail Protocol (HTMP), etc., to and from the SMPP protocol used for SMS services through the network 10. The SMPP messages ride on IP transport, e.g. between the gateway 31 and the SMSC 29.

As noted, each SMS message includes source and destination address fields. Typically, each address is either an MDN of a mobile station or a short code of an application service. The network routes a SMS message with a MDN destination address all the way through to the addressed mobile station 13 (or similarly to a telematics units 131 or 132). The network routes a SMS message with a short code destination address to a service provider application corresponding to the short code. Depending on the service, the application may process the message, e.g. to count votes; or the network may translate the short code to a destination address, e.g. an IP address of an external customer's server, such as the ESME server of a value added service provider or the like.

SMS routing thus allows use of short codes as a mechanism to route messages to/from an application service provider, as opposed to communication of messages between end user devices. For this purpose, the short code is recognized by a control application as being a message to a service provider as opposed to a message between SMS user devices, and the control application translates the short code to direct the message to the appropriate service provider platform.

For an outgoing SMS message from a mobile station 13, the message includes a source address comprising a field for the normal telephone number of the originating device and a field for another device identifier assigned by the network operator. In a typical SMS communication from a mobile station 13, the telephone number is the MDN whereas the other identifier is a MIN or IMSI. Similar identifiers can be used for messages from one of the telematics units 131, 132.

For SMS messages originating at a mobile station 13 or telematics unit, a node of the traffic network 15 such as a mobile switching center determines where to route the message. For a mobile originated (MO) message containing a telephone number of a destination (e.g. an MDN of another mobile station), the control node typically routes the message to one of several SMSCs 29 deployed in the network 15, based on the MIN of the sending device. Essentially, the control node looks up the point code or other form of address for the appropriate SMSC 29 based on the MIN of the sending mobile station 13 contained in the source field of the received SMS message. The SMSC 29 then determines how to deliver the message based on the destination address of the message, e.g. a directory number of another mobile station.

Short code routing could utilize a similar procedure to route messages to an SMSC, which determines proper handling. However, as such messages typically are directed to another server (of the application service provider), the network 15 can be configured to bypass the SMSC 29 for some or all mobile originated traffic. Hence, in the illustrated examples, the mobile switching center or other control node of the network 15, upon receiving a SMS message from a mobile station 13 or a telematics unit 131 or 132, which contains a short code as the destination address, routes the message through the network 15 to an appropriate one of the SMPP gateways 31. For traffic/load management reasons, a particular gateway 31 may be provisioned to handle the relevant traffic, e.g. for all mobile originated traffic addressed to any/all short codes or for mobile originated traffic addressed to a particular short code or set of short codes. For example, a SMPP gateway 31 designated for 'voting' type SMS application traffic may also handle mobile originated short code traffic for other applications or may be designated just to further handle upstream telematics transmissions. Of note for purposes of this discussion of handling of messaging traffic using a short code for one application, such as the telematics service, the network 10 routes all upstream messages that contain the one short code (the telematics service short code) through the traffic network 15 to a SMPP gateway 31, while bypassing the SMSC 29.

The gateway 31 normally routes SMS messages addressed short codes to an application server to which the particular short code has been assigned. For the telematics service, the telematics short code is assigned to the third party application server 39, therefore the SMPP gateway 31 routes the telematics SMS message to the application server 39, via the network 33 in our example. Such routing may entail translation of the one short code to an IP address of the server 39 (possibly with a port ID for the telematics service).

Upon receiving each mobile messaging service message, SMS message in the example, from a mobile device (mobile station 13, or telematics unit 131 or 132), via the wireless mobile communication network 10, the server 39 uses the source identification (MDN and/or MIN) to generate a destination address of the server 35 or 37 serving the sending device. The server 39 could generate an IP address and deliver the message directly through the network 33 to the appropriate server 35 or 37. However, in the example, the server 39 replaces the destination address of the message with a new short code uniquely assigned to the equipment of the particular service provider that offers telematics service to the sending customer/device. Obtaining the new short code, for example, could utilize a look-up table based on the complete MDN or based on a portion of the MDN (corresponding to a range of customer devices) to identify the short code of the appropriate server. After address replacement with the short code as a new destination address, the third party application server 39 then forwards the message with the short code back to the SMPP gateway 31 for normal processing and delivery through the network 33 to the appropriate server 35 or 37. A more detailed example of the processing of a mobile originated telematics message communication is discussed below with regard to FIG. 2.

As discussed above, the destination address of a SMS message usually contains a directory number or other full address of the destination, or the destination address field contains a predefined short code. In a normal operation for a SMS transmission to a mobile station 13, an SMSC 29 receives the message containing the MDN of the destination station 13 and queries the particular home location register that stores the record associated with that station's MDN for information about the mobile station 13 that is needed to route the message to the mobile station at its current location. The home location register responds by providing the current routing information, and the SMSC 29 uses that information to send the message through the network 15 and the serving base station 17 for delivery to the destination mobile station 13.

Messages sent from the application service providers' equipment to the telematics unit type mobile devices 131, 132 (mobile terminated or "MT" type traffic) are handled in much the same way. However, it may be desirable to have the telematics short code as the source address in such downstream messages when delivered to those mobile devices. An example using a short code translation by the third party application server 39 is discussed below with regard to FIG. 3. However, the third party server solution may not be necessary for the MT call flow if the originating address can be set to any value at application servers of the providers, such as servers 35 and 37.

It might be possible to implement various intelligent routing and/or translation functions in support of the message direction/distribution among the various service providers at the messaging service centers such as the SMSCs 29 in the example of FIG. 1. Another approach might be to redirect messages based on intelligent processing in a switch or control node of the network 15, in a manner analogous to forwarding or redirection of voice calls. However, such solutions require an upgrade of the processing of the message service center or the switch or control node, which may require a long time and a large expense to deploy across a large wireless mobile communication network 10. Also, such approaches tend to add processing burdens to existing elements that may have other possibly more critical functions. Hence, the examples implement the address and short code processing for mobile originated messages and possibly the translations for mobile terminated messages, for the telematics application service in our example, in another application server represented by the server 39 in the diagrams.

Also, the communications to/from the application server 39 could be initiated by any of several different elements of the network 10. For example, an SMSC could receive the relevant messages and send them to the server 39 for the necessary short code processing functions. However, the short code routing directly to a gateway 31 bypasses the SMSC and reduces processing burdens on the SMSC. By pointing a particular short code to a selected one of the gateways that is otherwise under utilized, it may also be possible to balance message traffic loading among various SMPP gateways that handle SMS in-bound and out-bound related traffic for a number of different application services.

It may be helpful now to discuss some examples of actual message processing, in the context of the exemplary telematics service. First, we will consider processing of mobile originated (MO) messages, in this case originated from the mobile devices that form or are incorporated in the exemplary telematics units, with reference to FIG. 2. For purposes of the example, we will assume that telematics units 131, 132 are programmed or hard coded with the short code "11111" assigned to the telematics service offered by Auto-CO to purchasers of its vehicles 121, 122. As shown by the arrows, in step 1, the units 131, 132 at various times send their upstream messages through the respective serving base stations 17 to the traffic network 15, for example, in response to crashes, user activation of a panic button or other triggering event/input. Each such message includes the short code 11111 in the destination address field of the message. However, the message from the unit 131 includes the MDN and/or MIN of the telematics unit 131 in the source field(s), and the message from the unit 132 includes the MDN and/or MIN of the telematics unit 132 in the source field(s). The traffic network 15 routes all such message that carry the short code 11111 in the destination address field to one of the SMPP gateways 31, as shown by the arrow representing step 2.

Programming or provisioning data in the SMPP gateway 31 causes that gateway to recognize that the telematics short code 11111 is assigned to the third party application server 39. Hence, the SMPP gateway 31 sends all messages with that code as the destination address through the network 33 to the third party application server 39, as shown by the arrow representing step, for example, by using an IP address of that server 39 as provisioned in the gateway 31 with respect to the 33333 short code.

The processing at the server 39 distinguishes between different sources for the upstream (MO) SMS messages. Messages from mobile devices of vehicle owners serviced by provider CO-A are to be directed to server 35, whereas messages from mobile devices of vehicle owners serviced by provider CO-B are to be directed to server 37. Hence, for discussion purposes, we will assume that the service for vehicle 121 is assigned to provider CO-A, therefore messages from the telematics unit 131 are to be directed to server 35. In contrast, in our example, we will assume that the service for vehicle 122 s assigned to provider CO-B, therefore messages from the telematics unit 132 are to be directed to server 37.

In our example, the addresses of the application servers 35 and 37 also are short codes. The application server 35 of service provider CO-A is assigned short code 22222, whereas the application server 37 of service provider CO-B is assigned short code 33333.

As outlined above relative to steps 1 and 2, the third party platform 39 receives all MO messages for short code 11111, for the telematics service of Auto-CO vehicles. Based on identification of each mobile device, the server 39 identifies an address for a server of a the appropriate provider of that application service; and the server 39 replaces the destination address of the message as received at the server 39 with the address of that application server, to enable forwarding of the MO short coded message through the network 33 to the third party application server 39. The new destination address could be an IP address for routing of the message directly through the network 33 to the appropriate server 35 or 37, but in our example, the new destination address is another short code assigned to the appropriate application server 35 or 37.

In the example, at step 3, the server 39 checks the originating address of the sending device (e.g. MDN and/or MIN) and based on that address generates an address of one of the servers 35 and 37. For example, for a first message received from the telematics unit 131 (first device in this example) of vehicle 121 (serviced by CO-A), the server 39 obtains from a look-up table or the like the short code 22222 for the application server 35. Then, the third party application server 39 replaces the destination address in the received message with the short code address 22222 for the server 35 of the first telematics service provider CO-A, as the new destination address in the first message that came from the telematics unit 131. The third party application server 39 sends the message back to the SMPP gateway 31. In step 4, for the first message, the SMPP gateway 31 in turn forwards the message based on the short code 22222 through the network 33 to the application server 35 for the first telematics service provider CO-A, for example, by using an IP address of that server 35 as provisioned in the gateway 31 with respect to the 22222 short code.

In contrast, with respect to the second message that comes to the server 39 from the telematics unit 132, at step 3, the server 39 checks the originating address of the sending device (e.g. MDN and/or MIN) and based on that address obtains from a look-up table or the like the short code 33333 for application server 37. Then, the third party application server 39 replaces the destination address in the received message with the short code address 33333 for the server 37 of the second telematics service provider CO-B, as the new destination address in the second message that came from the telematics unit 132. The third party application server 39 sends the message back to the SMPP gateway 31. In step 4, for the second message, the gateway 31 in turn forwards the message based on the short code 33333 through the network 33 to the application server 37 for the second telematics service provider CO-B, for example, by using an IP address of that server 37 as provisioned in the gateway 31 with respect to the 33333 short code.

Figure 2:
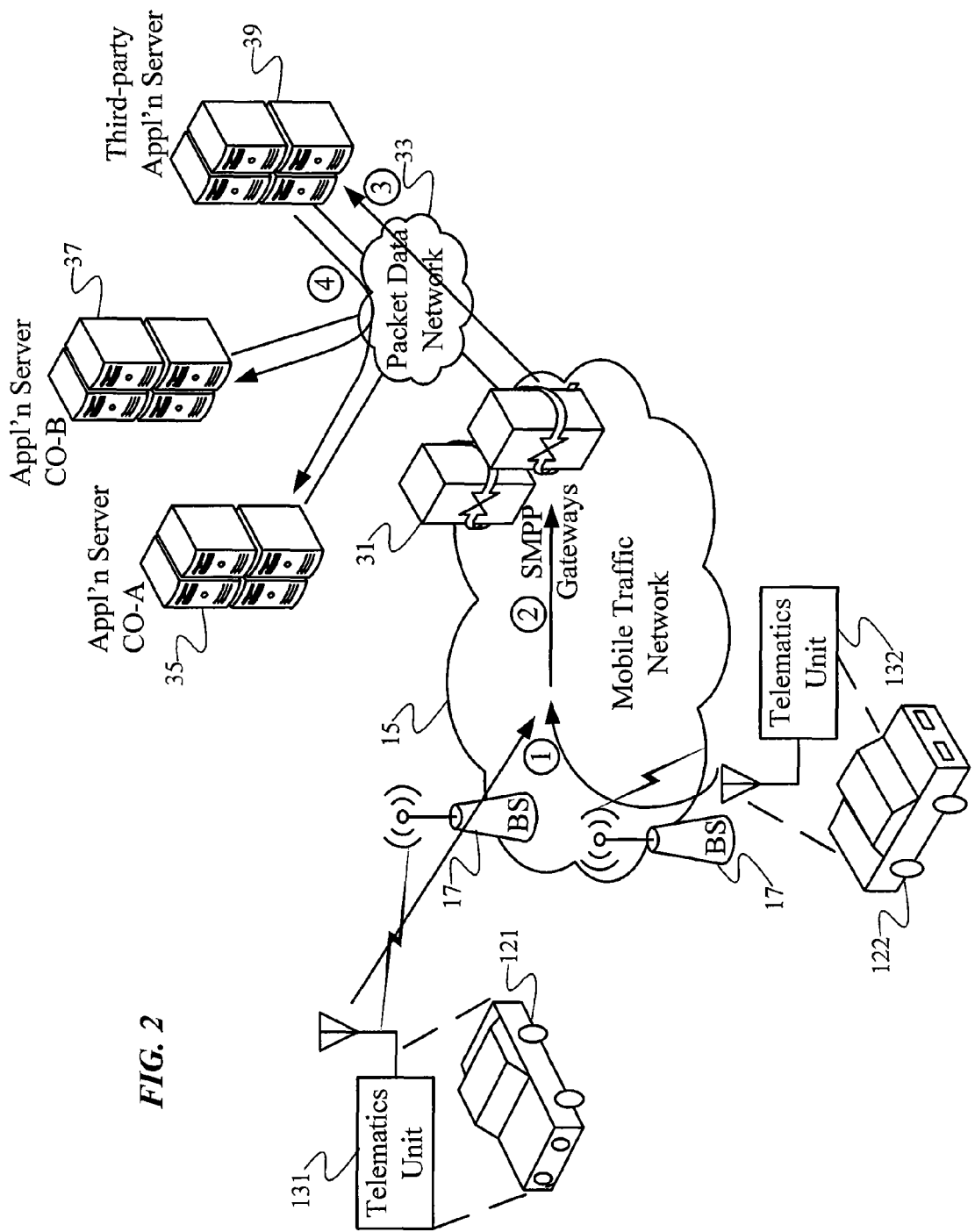
FIG. 2 is a parsed-down version of the diagram of FIG. 1, overlaid with signal flow arrows, to help illustrate certain processing involved in mobile originated (MO) type SMS message communications, for example, involved in the telematics service.

As shown by the example of two messages processed through the flow of FIG. 2, the application server 39 redirects messages initially addressed to the one common short code for the telematics service to equipment 35 and 37 of two different providers, based on identification of the respective mobile devices. In this way, the messages from two different mobile devices served by different providers of the one application service, can be routed to the equipment of the different service providers, even though the messages from the different mobile devices initially use the same short code as the initial destination address.

As noted, some application services, including some telematics services, may involve messaging service communications from the service provider equipment to the mobile devices (mobile terminated or "MT" type traffic). The service provider equipment typically includes a source address in each such downstream message transmission. It may be desirable to have the telematics short code, e.g. 11111, as the source address in such downstream messages when they arrive at mobile devices such as telematics units 131, 132. It may be possible to that the servers 35 and 37 set the source address to this short code value, in all downstream message transmissions. Alternatively, the third party application server 39 could offer a short code translation of the source address.

Figure 3:
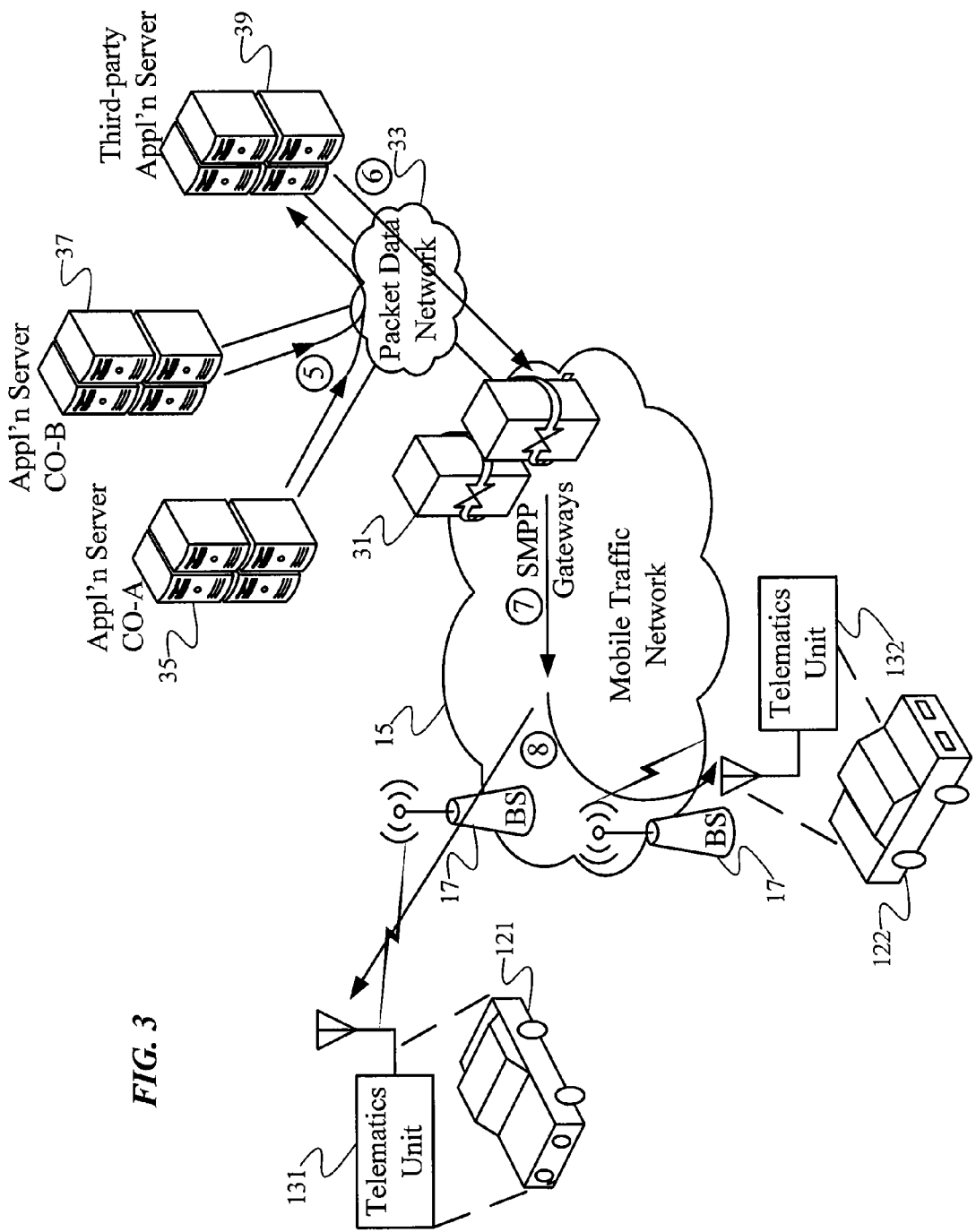
FIG. 3 also is a parsed-down version of the diagram of FIG. 1, overlaid with signal flow arrows, but helpful in illustrating certain processing involved in mobile terminated (MT) type SMS message communications, for example, involved in the telematics service.

FIG. 3 illustrates a call flow as might utilize such a feature or service on the third party application server 39.

As shown in FIG. 1, step 5 involves downstream message transmissions, initially sent from the application servers 35 and 37 of the two telematics service providers to the units 131, 132 of their respective customers. In step 5, each server sends the respective message through the network 33 with the appropriate destination MDN through the network 33 to the SMPP gateway 31. Here, we assume that the servers 35 and 37 have not set the source address to the 11111 short code of the of the telematics service. Hence, the message from server 35 for telematics unit 131 carries the short code 22222 of the server 35, and the message from server 37 for telematics unit 132 carries the short code 33333 of the server 37. In the normal manner, these messages addressed to mobile device destinations are routed through packet data network 33 to one of the SMPP gateways 31. The SMPP gateway 31 forwards these messages to the third party application server 39, through the network 33 in our example (for ease of illustration, the arrows 5 go from the servers 35, 37 to the server 39).

Upon receipt of the message from server 35 for telematics unit 131, the third party application server 39 translates the short code 22222 of the server 35 into the 11111 short code of the of the telematics service, and replaces the short code 22222 with the short code 11111 in the source address field of the message. Similarly, upon receipt of the message from server 37 for telematics unit 132, the third party application server 39 translates the short code 33333 of the server 37 into the 11111 short code of the of the telematics service, and replaces the short code 33333 with the short code 11111 in the source address field of that message.

In step 6 (FIG. 3), each message with the translated source address, is forwarded through the packet data network 33 to the SMPP gateway 31. These messages still contain the MDNs of the respective telematics units 131, 132. Hence, in the normal manner, the gateway 31 forwards these messages through the mobile traffic network 15, at step 7. This would typically involve routing to an SMSC (shown in FIG. 1 but not in FIG. 3), and the network 10 would subsequently deliver the messages to the respective telematics units 131, 132 as shown as arrows at step 8. To the receiving telematics units 131, 132, the messages would appear to have come from the same source corresponding to the one short code assigned for the telematics service of Auto-CO.

As shown by the above discussion, functions relating to the processing of short codes/addresses and redirecting messages for one application service as among equipment of multiple providers of the one service may be implemented on one or more computers connected for data communication via the components of a packet data network, and thus with the wireless mobile communication network, which operate as the third party application server 39 as shown in FIGS. 1 to 3. Although special purpose devices may be used, such devices also may be implemented using one or more hardware platforms intended to represent a general class of data processing device commonly used to run "server" programming, for example ESME server programming, so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the short code related functions described in the examples above. The software code is executable by the general-purpose computer that functions as the third party application server or the like that performs the address processing functions. In operation, the code is stored within the general-purpose computer platform. At other times, however, the software may be stored at other locations and/or transported for loading into the appropriate general-purpose computer system. Execution of such code by a processor or other CPU implementation in the computer platform enables the platform to implement the methodology for message processing in support of the application service offered by multiple provider platforms, in essentially the manner performed in the implementations discussed and illustrated herein.

Figures 4, 5:
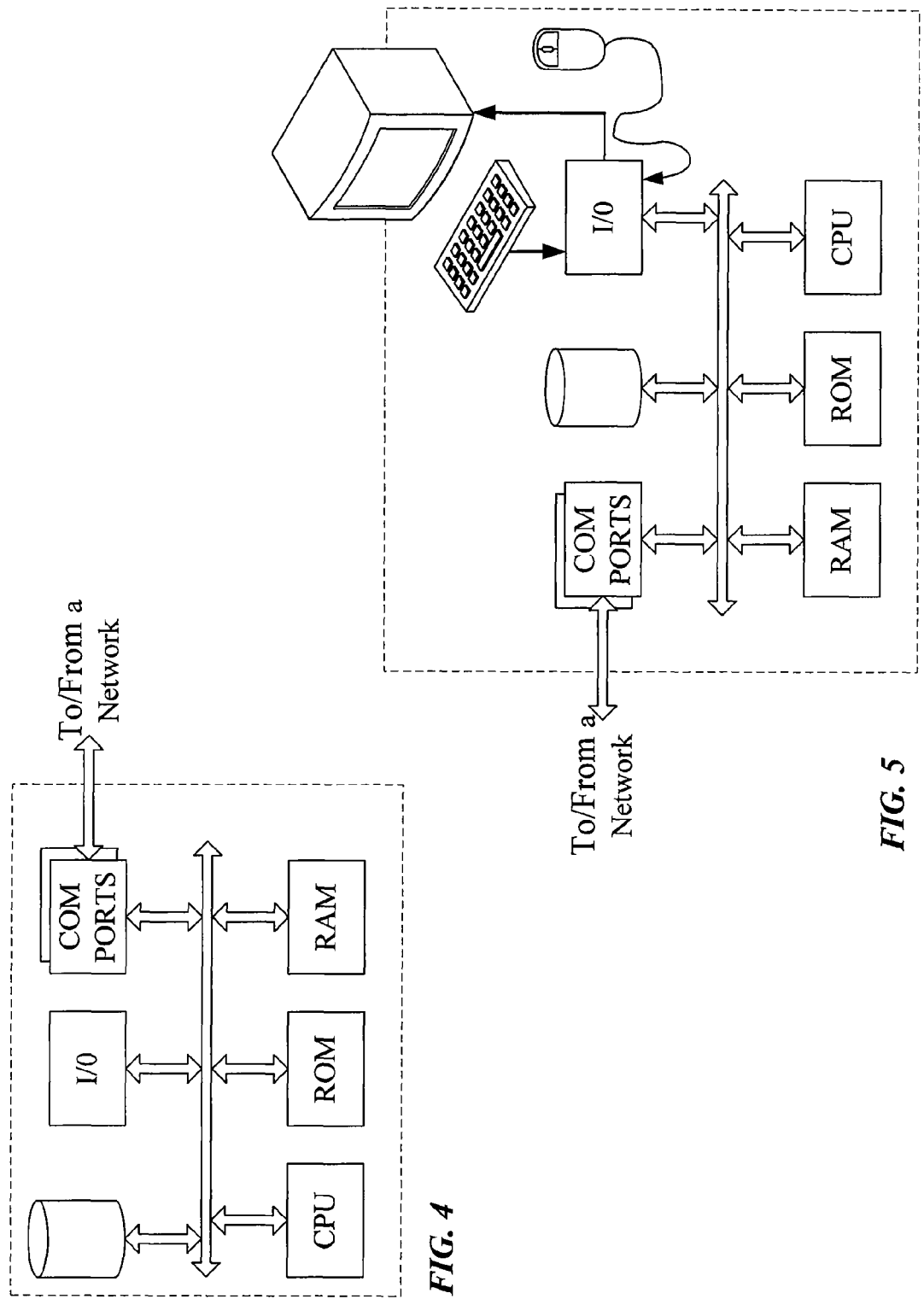
FIG. 4 is a simplified functional block diagram of a computer that may be configured as a host or server.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer (PC) or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

The hardware for a server platform or computer, for example, includes a data communication interface for packet data communication. The server hardware also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the functions of various servers, such as each of the application servers 35, 37 and 39 discussed above, may be implemented in a distributed fashion on a number of similar hardware platforms, to distribute the processing load.

Hence, aspects of the methods of short code based message redirection and/or translation functions outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of an operator into the computer platform of the third party application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the address and short code processing regarding messages for the one application service, as described herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates acronyms to terms, as used in the detailed description above.

1XRTT—One (1) times (x) Radio Transmission Technology
3GPP—3rd Generation Partnership Project
3GPP2—3rd Generation Partnership Project 2
BS—Base Station
BTS—Base Transceiver System
CD—Compact Disk
CD-ROM—Compact Disk-Read Only Memory
DVD—Digital Video Disk
DVD-ROM—Digital Video Disk-Read Only Memory
EEPROM—Electrically Erasable Programmable Read Only Memory
EPROM—Erasable Programmable Read Only Memory
ESME—External Short Message Entity
EVDO—1x/Evolution—Data Only
GSM—Global System for Mobile
GW—Gateway
HTMP—Hypertext Mail Protocol
HTTP—Hypertext Transfer Protocol
ID—IDentification
IP—Internet Protocol
IR—InfraRed
LTE—Long Term Evolution
MDN—Mobile Director Number
MIN—Mobile Identification Number
MMS—Multimedia Messaging Service
MMSC—Multimedia Messaging Service Center
MO—Mobile Originated
MS—Mobile Station
MT—Mobile Terminated
PROM—Programmable Read Only Memory
RAM—Random Access Memory
RAN—Radio Access Network
RF—Radio Frequency
ROM—Read Only Memory
SMPP—Short Message Peer-to-Peer
SMS—Short Messaging Service
SMSC—Short Messaging Service Center
UMTS—Universal Mobile Telecommunications Systems
XML—Extensible Markup Language

What is claimed is:

1. A method of processing mobile messaging service messages relating to one application service for a plurality of mobile devices where the one application service is available from servers of a plurality of application service providers, the method comprising steps of:

receiving a first mobile messaging service message from a first mobile device routed through a wireless mobile communication network based on a first messaging service short code of the one application service at least initially contained in the first message as a destination address;

based on identification of the first mobile device, obtaining a second messaging service short code for a server of a first provider of the one application service;

replacing the first messaging service short code in the first message with the second messaging service short code for the server of the first provider as a new destination address for the first message;

forwarding the first message for routing based on the second messaging service short code for the server of the first provider as the new destination address of the first message;

receiving a second mobile messaging service message from a second mobile device routed through the wireless mobile communication network based on the first messaging service short code of the one application service at least initially contained in the second message as a destination address;

based on identification of the second mobile device, obtaining a third messaging service short code for a server of a second provider of the one application service, different from the second messaging service short code for the server of the first provider;

replacing the first messaging service short code in the second message with the third messaging service short code for the server of the second provider as a new destination address for the second message; and forwarding the second message for routing based on the third messaging service short code for the server of the second provider as the new destination address of the second message.

2. The method of claim 1, wherein:
identification of the first mobile device comprises a mobile directory number assigned to the first mobile device contained in the received first mobile messaging service message; and
identification of the second mobile device comprises a mobile directory number assigned to the second mobile device contained in the received second mobile messaging service message.

3. The method of claim 1, wherein the first and second mobile messaging service messages are short messaging service (SMS) messages.

4. The method of claim 3, wherein:
the application service is a vehicular telematics service; and
the first and second mobile devices are telematics units mounted in first and second vehicles.

5. The method of claim 1, wherein
the first messaging service short code assigned to the one application service, the second messaging service short code assigned to the first provider, and the third messaging service short code assigned to the second provider are different from each other.

6. The method of claim 1, further comprising:
receiving a third mobile messaging service message from the server of the first provider addressed to the first mobile device, the third message containing the second messaging service short code for the server of the first provider as the source address of the third mobile messaging service message;
replacing the second messaging service short code for the server of the first provider with the first messaging service short code of the one application service, as the source address of the third mobile messaging service message;
forwarding the third message for routing through the wireless mobile communication network to the first mobile device;
receiving a fourth mobile messaging service message from the server of the second provider addressed to the second mobile device, the fourth message containing the third messaging service short code for the server of the second provider as the source address of the fourth mobile messaging service message;
replacing the third messaging service short code for the server of the second provider with the first messaging service short code of the one application service, as the source address of the fourth mobile messaging service message; and
forwarding the fourth message for routing through the wireless mobile communication network to the first mobile device.

7. The method of claim 1, wherein:
the steps are implemented in a third party application service provider server coupled for communication of messaging service messages via the wireless mobile communication network; and
the third party application service provider server is separate from the server of the first provider of the one application service and from the server of the second provider of the one application service.

8. An application server, comprising:
an interface for message communication with a wireless mobile communication network;
a central processing unit;
a memory;
a program stored in the memory for execution by the central processing unit, wherein execution of the program configures the central processing unit to operate the application server to perform functions, including functions to:
a) receive a first mobile messaging service message from a first mobile device routed through a wireless mobile communication network based on a first messaging service short code of the application service at least initially contained in the first message as a destination address;
b) based on identification of the first mobile device, obtain a second messaging service short code for a server of a first provider of the one application service;
c) replace the first messaging service short code in the first message with the second messaging service short code for the server of the first provider as a new destination address for the first message;
d) forward the first message for routing based on the second messaging service short code for the server of the first provider as the new destination address of the first message;
e) receive a second mobile messaging service message from a second mobile device routed through the wireless mobile communication network based on the first messaging service short code of the one application service at least initially contained in the second message as a destination address;
f) based on identification of the second mobile device, obtain a third messaging service short code for a server of a second provider of the one application service, different from the second messaging service short code for the server of the first provider;
g) replace the first messaging service short code in the second message with the third messaging service short code for the server of the second provider as a new destination address for the second message; and
h) forward the second message for routing based on the third messaging service short code for the server of the second provider as the new destination address of the second message.

9. The application server of claim 8, wherein the program configures the application server as an external short message entity (ESME) server.

10. The application server of claim 9, wherein the program enables the application server to process short message service (SMS) type messages as the first and second messages.

11. The application server of claim 10, wherein:
identification of the first mobile device comprises a mobile directory number assigned to the first mobile device contained in the received first mobile messaging service message; and
identification of the second mobile device comprises a mobile directory number assigned to the second mobile device contained in the received second mobile messaging service message.

12. The application server of claim 11, wherein
the first messaging service short code assigned to the one application service, the second messaging service short code assigned to the first provider, and the third messaging service short code assigned to the second provider are different from each other.

13. The application server of claim 8, wherein execution of the program causes the central processing unit to operate the application server to perform functions further including functions to:
receive a third mobile messaging service message from the server of the first provider addressed to the first mobile device, the third message containing the second messaging service short code for the server of the first provider as the source address of the third mobile messaging service message;
replace the second messaging service short code for the server of the first provider with the first messaging service short code of the one application service, as the source address of the third mobile messaging service message;
forward the third message for routing through the wireless mobile communication network to the first mobile device;
receive a fourth mobile messaging service message from the server of the second provider addressed to the second mobile device, the fourth message containing the third messaging service short code for the server of the second provider as the source address of the fourth mobile messaging service message;
replace the third messaging service short code for the server of the second provider with the first messaging service short code of the one application service, as the source address of the fourth mobile messaging service message; and
forward the fourth message for routing through the wireless mobile communication network to the first mobile device.

14. An article of manufacture, comprising:
a non-transitory machine readable storage medium; and
programming instructions embodied in said medium for execution by at least one computer, wherein execution of the programming instructions configures said at least one computer to perform functions for processing mobile messaging service messages relating to one application service for a plurality of mobile devices where the one application service is available from servers of a plurality of application service providers, including functions to:
receive a first mobile messaging service message from a first mobile device routed through a wireless mobile communication network based on a first messaging service short code of the one application service at least initially contained in the first message as a destination address;
based on identification of the first mobile device, obtain a second messaging service short code for a server of a first provider of the one application service;
replace the first messaging service short code in the first message with the second messaging service short code for the server of the first provider as a new destination address for the first message;
forward the first message for routing based on the second messaging service short code for the server of the first provider as the new destination address of the first message;
receive a second mobile messaging service message from a second mobile device routed through the wireless mobile communication network based on the first messaging service short code of the one application service at least initially contained in the second message as a destination address;
based on identification of the second mobile device, obtain a third messaging service short code for a server of a second provider of the one application service, different from the second messaging service short code for the server of the first provider;
replace the first messaging service short code in the second message with the third messaging service short code for the server of the second provider as a new destination address for the second message; and
forward the second message for routing based on the third messaging service short code for the server of the second provider as the new destination address of the second message.

15. The article of manufacture of claim 14, wherein:
identification of the first mobile device comprises a mobile directory number assigned to the first mobile device contained in the received first mobile messaging service message; and
identification of the second mobile device comprises a mobile directory number assigned to the second mobile device contained in the received second mobile messaging service message.

16. The article of manufacture of claim 14, wherein
the first messaging service short code assigned to the one application service, the second messaging service short code assigned to the first provider, and the third messaging service short code assigned to the second provider are different from each other.

17. The article of manufacture of claim 14, wherein execution of the programming instructions causes said at least one computer to perform functions further comprising functions to:
receive a third mobile messaging service message from the server of the first provider addressed to the first mobile device, the third message containing the second messaging service short code for the server of the first provider as the source address of the third mobile messaging service message;
replace the second messaging service short code for the server of the first provider with the first messaging service short code of the one application service, as the source address of the third mobile messaging service message;
forward the third message for routing through the wireless mobile communication network to the first mobile device;
receive a fourth mobile messaging service message from the server of the second provider addressed to the second mobile device, the fourth message containing the third messaging service short code for the server of the second provider as the source address of the fourth mobile messaging service message;
replace the third messaging service short code for the server of the second provider with the first messaging service short code of the one application service, as the source address of the fourth mobile messaging service message; and
forward the fourth message for routing through the wireless mobile communication network to the first mobile device.

* * * * *